United States Patent
Jung

(12) 
(10) Patent No.: US 10,020,694 B2
(45) Date of Patent: Jul. 10, 2018

(54) ELECTRIC APPARATUS INCLUDING ROTOR, STATOR, AND SHAFT

(71) Applicant: Ja Choon Jung, Seoul (KR)

(72) Inventor: Ja Choon Jung, Seoul (KR)

(*) Notice: Subject to any disclaimer, the term of this patent is extended or adjusted under 35 U.S.C. 154(b) by 656 days.

(21) Appl. No.: 14/560,507

(22) Filed: Dec. 4, 2014

(65) Prior Publication Data

US 2016/0164352 A1 Jun. 9, 2016

(51) Int. Cl.
*H02K 1/27* (2006.01)
*H02K 1/06* (2006.01)
*H02K 21/12* (2006.01)

(52) U.S. Cl.
CPC ............ *H02K 1/06* (2013.01); *H02K 21/12* (2013.01); *H02K 2213/03* (2013.01); *Y10S 74/09* (2013.01)

(58) Field of Classification Search
CPC ............ H02K 1/17; H02K 1/27; H02K 53/00; H02K 1/06; H02K 21/12; H02K 21/22; H02K 1/146; H02K 21/16; H02K 1/14

USPC .................. 310/112–114, 156.37
See application file for complete search history.

(56) References Cited

U.S. PATENT DOCUMENTS

| | | | |
|---|---|---|---|
| 7,791,241 B2 | 9/2010 | Takeuchi | |
| 2010/0187938 A1* | 7/2010 | Yamamoto | H02K 3/12 310/195 |
| 2012/0112594 A1* | 5/2012 | Sano | H02K 1/146 310/159 |
| 2012/0133231 A1* | 5/2012 | Hayakawa | H02K 21/24 310/156.37 |
| 2012/0299402 A1* | 11/2012 | Ota | H02K 21/22 310/50 |

* cited by examiner

*Primary Examiner* — Joshua Benitez Rosario
*Assistant Examiner* — Leda Pham
(74) *Attorney, Agent, or Firm* — Hauptman Ham, LLP

(57) ABSTRACT

A generator includes a plurality of magnets defining one of a rotor and a stator, a conductor including a core and a coil, the conductor defining the other of the rotor and the stator, and a shaft to which the stator is fixable. The core has a width inwardly narrowed from an outer edge toward an inner edge along a longitudinal direction of the core.

11 Claims, 7 Drawing Sheets

ELECTRIC APPARATUS INCLUDING ROTOR, STATOR, AND SHAFT

BACKGROUND

1. Field

The present disclosure relates to an electric apparatus, and more particularly, to an electric apparatus including a rotor, a stator, and a shaft.

2. Description of the Related Art

An electric apparatus includes a rotor, a stator, and a shaft. Such an electric apparatus, for example, a generator includes a magnet and a conductor (including a coil and a core) generates an electromotive force e that is proportional to a magnetic field intensity B, a length of conductor L, and a relative velocity v between the magnetic field and the conductor, as defined by the following equation (Fleming's right hand rule).

$$e = B \cdot l \cdot v \tag{1}$$

In general, the generator is implemented as a cylindrical two-pole single-phase generator or three-phase alternating-current generator, which includes a magnet and a conductor with one being a rotor and the other being a stator, in order to obtain the maximum electromotive force in a minimum space.

The basic structure of the three-phase alternating-current generator includes one two-pole magnet and three conductors (in case the magnet constitutes the rotor and the conductors constitute a stator) or three two-pole magnets and one conductor (in case the magnets constitute a rotor and the conductor constitutes a stator). Through the structure constructed in this manner, it is possible to enhance the efficiency of the generator by structurally appropriately arranging a plurality of magnets and a plurality of conductors in the structure, thereby increasing the electromotive force of the three-phase generator.

The electric apparatus is a generator and a motor at the same time. The reversibility between the generator and the motor can be explained via Fleming's right hand rule and left hand rule. The electric apparatus comes to be a generator and generates an electric current when the rotor is rotated by an external force, whereas it comes to be a motor which generates a force and rotates the rotor when an electric current is flowed in the conductor. That is, it can be said that the generator and the motor are quantitatively the same, and such a quantitative identity is related to energy conservation law.

For example, U.S. Pat. No. 7,791,241 describes a generator including a rotor having 4n magnets and a stator including 3n cores.

SUMMARY

According to some embodiments, an electric apparatus includes a plurality of magnets defining one of a rotor and a stator, a conductor including a core and a coil, the conductor defining the other of the rotor and the stator, and a shaft to which the stator is fixable. The core has a width inwardly narrowed from an outer edge toward an inner edge along a longitudinal direction of the core.

According to some embodiments, an electric apparatus includes a plurality of magnets defining one of a rotor and a stator, a conductor including a core and a coil, the conductor defining the other of the rotor and the stator, and a shaft to which the stator is fixable. An average value of a total torque applied to the rotor under a load condition is a positive value.

According to some embodiments, an electric apparatus includes a plurality of magnets defining one of a rotor and a stator, a conductor including a core and a coil, the conductor defining the other of the rotor and the stator, and a shaft to which the stator is fixable. A ratio of the number of magnets n to the number of conductors m satisfies n:m=4:3. When an external diameter $R_i$ [mm] of the electric apparatus takes discrete values $\log R_i = 2 + 0.5$ (i−1) (i=1, 2, 3, ... ), a ratio of the number of magnets n and the number of conductors m satisfies n:m=4 $L_i$:3 $L_i$ as the external diameter $R_i$ [mm] of the electric apparatus increases satisfying $L_i = 8 \log R_i - 12$ (i=1, 2, 3, ..., where $L_i$ is rounded to an integer), and satisfies n:m=4 $L_i$:3 $L_i$ in a range of $0 \leq R_1$ and n:m=4 $L_{i+1}$:3 $L_{i+1}$ in a range of $R_i \leq R_{i+1}$.

The above and other objects, features, advantages and technical and industrial significance of this disclosure will be better understood by reading the following detailed description of exemplary embodiments of the disclosure, when considered in connection with the accompanying drawings.

DETAILED DESCRIPTION OF THE PREFERRED EMBODIMENTS

Exemplary embodiments of the present disclosure are described in detail below with reference to the accompanying drawings.

In the description below, though a three-phase alternating-current generator is described as an example of the electric apparatus according to the present disclosure, it can be applied to a three-phase alternating-current motor in a reversible manner. The present disclosure improves structural property, arrangement, and layout of the magnet, the coil, and the core, which are elements of a typical three-phase alternating-current generator, thus improving torque and power efficiency of the three-phase alternating-current generator. This will be described using a simulation result from a finite element method (FEM) using an Ansoft Maxwell version 14.

Figure 1:
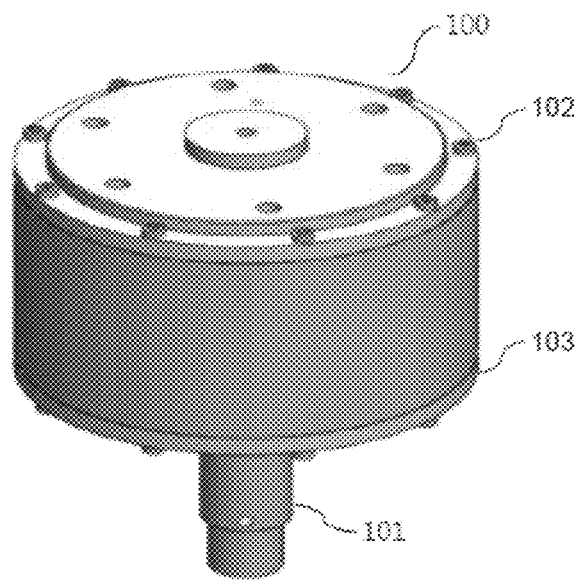
FIG. 1 is a perspective view of a generator or a motor as an example of an electric apparatus according to some embodiments of the present disclosure.
Figure 2:
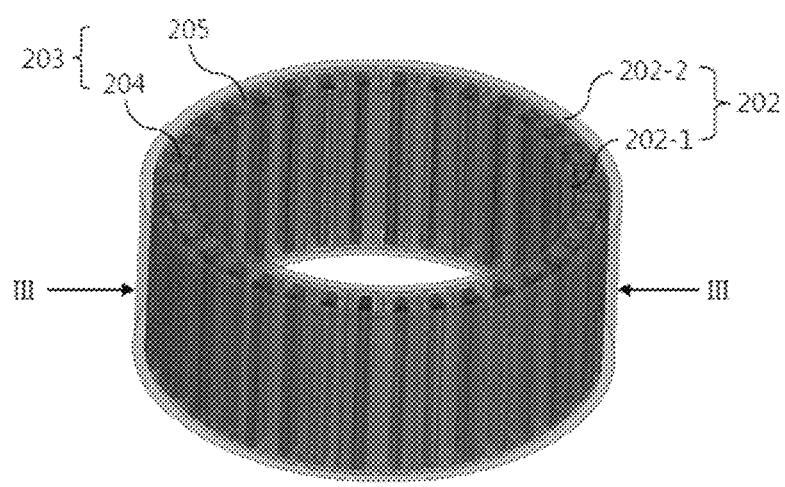
FIG. 2 is a schematic diagram of a rotor and a stator within the electric apparatus shown in FIG. 1.
Figure 3:
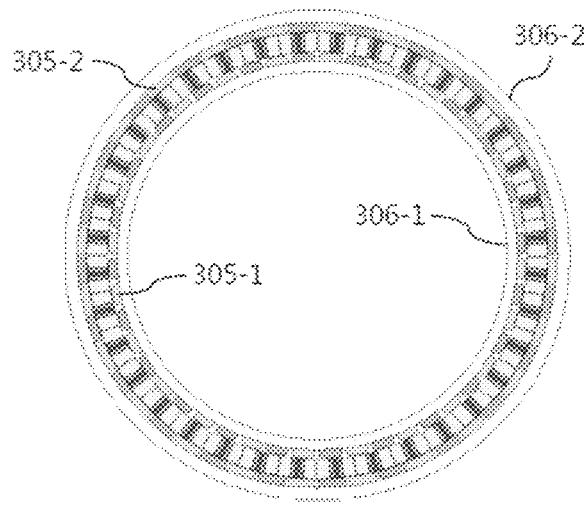
FIG. 3 is a cross-sectional view taken through line III-III of the rotor and the stator shown in FIG. 2.

FIG. 1 is an outside view of a generator or a motor as an example of an electric apparatus 100 according to some embodiments of the present disclosure. FIG. 2 is a schematic diagram of a rotor 202 and a stator 203 of the electric apparatus 100 shown in FIG. 1. FIG. 3 is a cross-sectional view of the rotor 202 and the stator 203 cut along a line III-III shown in FIG. 2.

The electric apparatus 100 shown in FIG. 1 includes a rotor (or a stator) having a plurality of magnets and at least one yoke, a stator (or a rotor) including a conductor that includes a core and a coil, and a shaft 101 to which a stator is fixed, where the electric apparatus serves as a generator configured to generate an electromotive force according to the Fleming's right hand rule when the rotor is rotated by an external force and to generate an electric current through a conductor. Alternatively, the electric apparatus serves as a motor of which the rotor is rotated by a force generated according to the Fleming's left hand rule when an electric current is applied to the conductor.

The rotor of the electric apparatus 100 shown in FIG. 2 is a dual rotor structure including an inner rotor 202-1 and an outer rotor 202-2. A stator 203 including a conductor that includes a core 204 and a coil 205 is located between the inner rotor 202-1 and the outer rotor 202-2.

The inner rotor 202-1 includes a plurality of magnets 305-1 that generates magnetic flux and an inner yoke 306-1 including a magnetic substance that shields the magnetic flux from leaking to the outside. The outer rotor 202-2 includes a plurality of magnets 305-2 that generates magnetic flux and an outer yoke 306-2 including a magnetic substance that shields the magnetic flux from leaking to the outside.

As shown in FIG. 1, the electric apparatus 100 includes a top plate 102 and a bottom plate 103. The top plate 102 and the bottom plate 103 connect the inner yoke 306-1 and the outer yoke 306-2, and couples the rotor 202 and the stator 203 for the rotor 202 to be rotatable around the stator 203 via a shaft 101 and a bearing (not shown).

While the rotor 202 shown in FIG. 2 is a dual rotor system using the inner rotor 202-1 and the outer rotor 202-2, it can be a single rotor system using one of the inner rotor 202-1 and the outer rotor 202-2. Further, in the example shown in FIG. 2, though the plurality of magnets and the at least one yoke constitute a rotor and the conductor including the coil and the core constitutes a stator, it can be configured in a reversed manner, such that the plurality of magnets and the at least one yoke constitute a stator and the conductor including the coil and the core constitutes a rotor.

The magnets 305 located on the outer side and the inner side include N-S pole permanent magnets and S-N pole permanent magnets arranged alternatively.

In the electric apparatus shown in FIG. 3, the number of the conductors should be a multiple of 3 in order to equally generate 3-phase, and the magnets should be arranged in a multiple of 4 in order to apply uniform magnetic force to the conductors of the multiple of 3. Thus, the overall arrangement of the magnets and conductors (cores) should be maintained at a ratio of 4:3. Also, in the case of a dual rotor scheme, the ratio of the number of outer magnets:the number of inner magnets:the number of conductors should be 4:4:3.

Although it is possible to arrange the magnets and the conductors in various ways, it is found in simulation results that there is an optimal arrangement according to the external diameter R of the electric apparatus (outer yoke). Generally, the efficiency of the generator can be calculated as follows:

$$\eta = \frac{\text{Electrical Output(Current} \times \text{Voltage)}}{\text{Mechanical Input(Force} \times \text{Speed or Torque} \times \text{Angular Velocity)}} \quad (2)$$

$$= \frac{P_o}{P_i} = \frac{e_i \cdot i_i}{F \cdot v} = \frac{e_i \cdot i_i}{\tau \cdot \omega}$$

where $e_i$ is induced electromotive force [V], $i_i$ is induced current [A], F is force applied from the outside [N], $v$ is rotor speed [m/s], and $\tau$ is torque applied from the outside [N; m].

In other words, the efficiency of the generator can be expressed as a value of electrical output divided by mechanical input, where the electrical output is represented by the current times voltage, and the mechanical input is represented by the torque times angular velocity (or force times rate).

Also, if it is defined that $F_0$ is a force required for generating electric power from the internal, an electric current begins to flow in the conductors of the internal when the force $F_0$ is applied to the generator, and then force $F_{11}$ is generated in the direction to resist the force $F_0$ based on Fleming's left hand rule via the surrounding magnets. Thus, the force required for actually producing a rated power is the force F adding up $F_0$ and $F_{11}$.

As a result, the key is a technique for controlling the force F, and it is needed to implement the structure and arrangement of the magnet and core etc., which are elements of a generator in order to realize an optimal force.

In the description below, since a force is expressed as the product of torque and distance and the magnitude of the force is proportional to the torque of a rotor when the distance is constant, the present disclosure is described based on a torque rather than the force expressed as F because it is easy to describe in engineering standpoint.

Figure 4:
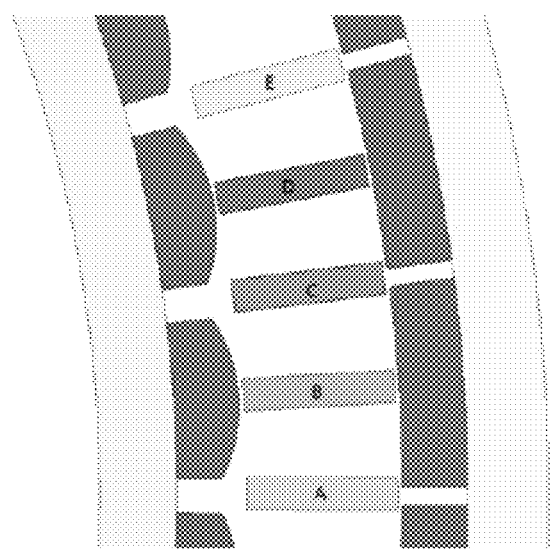
FIG. 4 is a partial cross-sectional view of an electric apparatus including a typical rotor and a typical stator.
Figure 5:
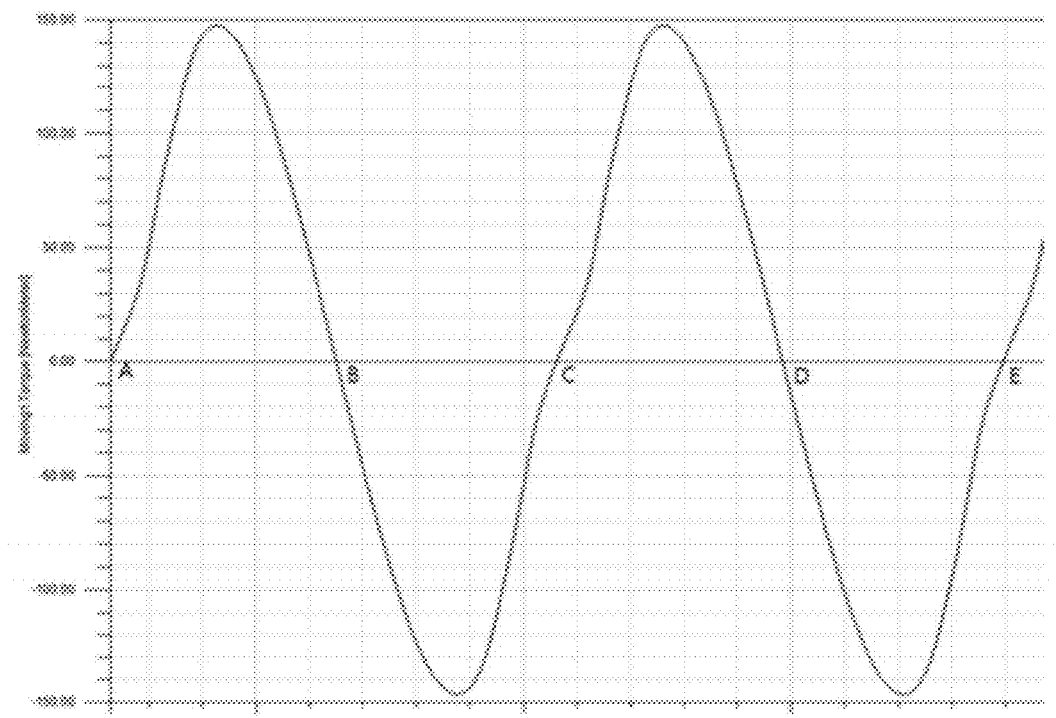
FIG. 5 is a graph showing simulation results of rotor torque change of the electric apparatus including the typical rotor and the typical stator shown in FIG. 4.
Figure 6:
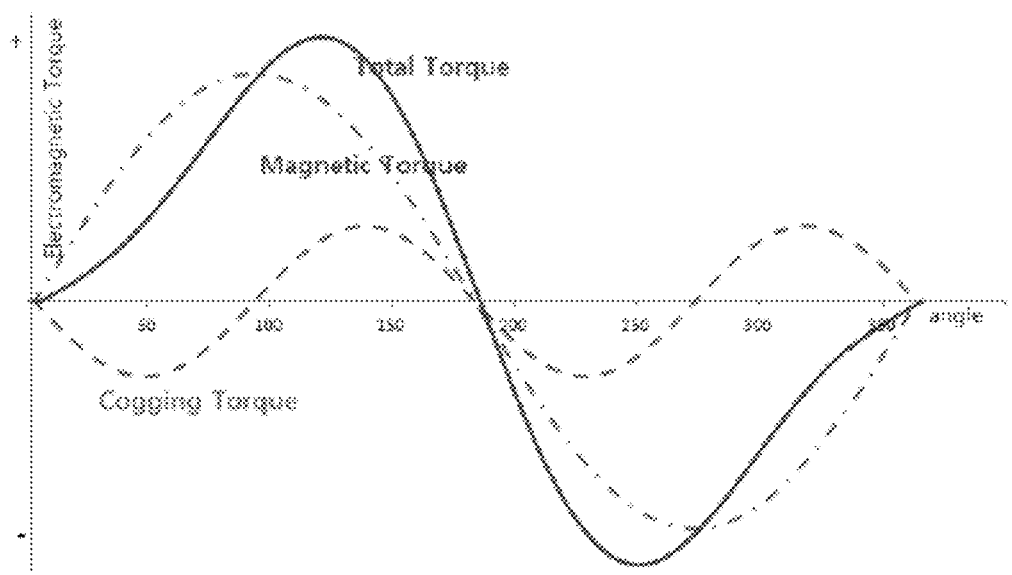
FIG. 6 is a graph showing a relationship among cogging torque, magnetic torque, and total torque.

FIG. 4 is a partial cross-sectional view of an electric apparatus including a typical rotor and a typical stator. FIG. 5 is a graph showing simulation results of rotor torque change of the electric apparatus including the typical rotor and the typical stator shown in FIG. 4. FIG. 6 is a graph showing a relationship among cogging torque, magnetic torque, and total torque.

As shown in FIG. 4, the conductors (cores) of a typical electric apparatus are such that the cross section cut in the longitudinal direction of the conductors has a rectangular shape. As shown in FIG. 5, in the rotor torque change of a typical electric apparatus, the average torque value is zero. The average torque value of zero means that the force to move the rotor is zero, so the rotor is stationary. The average torque value of positive value means the acceleration of rotor movement direction, whereas the average torque value of negative value means the deceleration of rotor movement direction.

Thus, the acceleration, deceleration and stationary state of a rotor can be predicted by the average torque value, where the total torque applied to the rotor is calculated by separately defining reluctance torque or cogging torque by the relative position and distance of separation between the magnets and the conductors, and Magnetic Torque by reverse electromotive force between the magnets and the conductors, which represent an external force in the inside of the electric apparatus comprising a rotor and a stator. The total torque under a load condition can be represented by a sum of the reluctance torque (or cogging torque) and the magnetic torque.

For example, FIG. 6 shows simulation results of the relationship among the cogging torque, the magnetic torque, and the total torque of the rotor, defined as above, where the maximum value of the total torque is generated at 118 degrees as illustrated in FIG. 6.

In FIG. 6, the magnetic torque disrupting the movement of a rotor is maximized at the relative position between a stator and a rotor of starting point at which the total torque is raised to generate maximum electric power, thus disrupting the rotational movement of the rotor. And at the point that the electric power is gradually reduced, that is, after the maximum point of the maximum torque, the reluctance torque or cogging torque that represents an external force is maximized, and serves to accelerate the movement of the rotor. Further, it can be seen that the reluctance torque and the magnetic torque act equally even in the period of negative torque in the same manner as in the period of positive torque. If the average value of the reluctance torque is a positive value, the overall efficiency can be increased.

Figure 7:
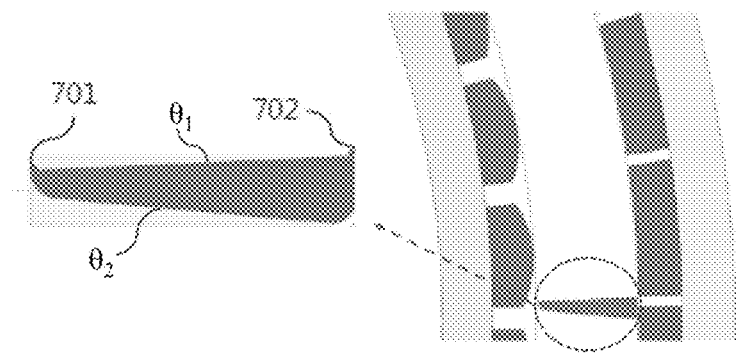
FIG. 7 is a partial cross-sectional view of an electric apparatus including a rotor and a stator according to some embodiments of the present disclosure.

As shown in FIG. 7, some embodiments of the present disclosure discloses a shape of the core comprised in a conductor, where the core has a shape with its width being narrowed toward the inside from the outside in the radial direction by first angle $\theta_1$ and second angle $\theta_2$ for the first side toward the direction of rotation of a rotor and the second side toward the direction opposite to the direction of rotation of the rotor, respectively.

Though the first angle $\theta_1$ and the second angle $\theta_2$ may be same angle or different angle each other, in the embodiment shown in FIG. 7, the first side and the second side have an asymmetric shape about the center line of the core where the first angle $\theta_1$ and the second angle $\theta_2$ are $\theta_2 > \theta_1$.

Figure 8:
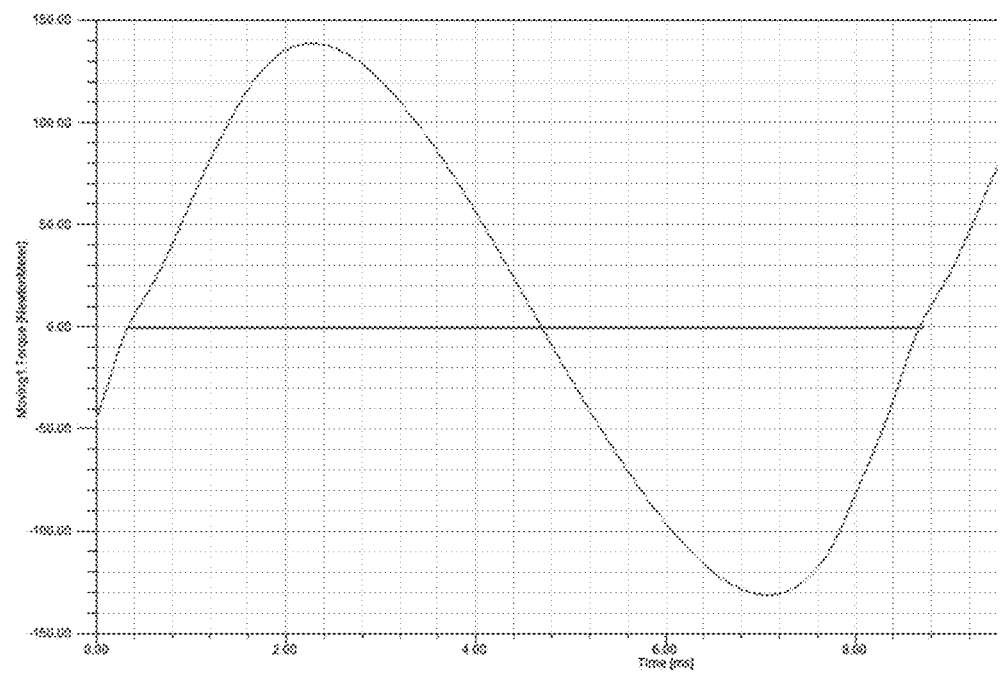
FIG. 8 is a graph showing simulation results of rotor torque change of the electric apparatus including the rotor and the stator according to some embodiments of the present disclosure shown in FIG. 7.

FIG. 8 is a graph showing simulation results of the rotor torque change of the electric apparatus including a rotor and a stator according to some embodiments of the present disclosure shown in FIG. 7.

As shown in FIG. 8, in the electric apparatus including the rotor and the stator according to some embodiments of the present disclosure, when the maximum value of the positive in the total torque value of the rotor is compared with the minimum value of the negative in absolute value, it can be seen that the absolute value of the maximum value of the positive is significantly greater than the absolute value of the minimum value of the negative. That is, in case of a typical rotor, the average torque value is zero, whereas the average torque value of the rotor according to the embodiment of the present disclosure has a positive value where the rotor comprises a core having a form with its width being narrowed toward the inside from the outside in the radial direction by first angle $\theta_1$ and second angle $\theta_2$ for the first side toward the direction of rotation of the rotor and the second side toward the direction opposite to the first side, respectively.

Figure 9:
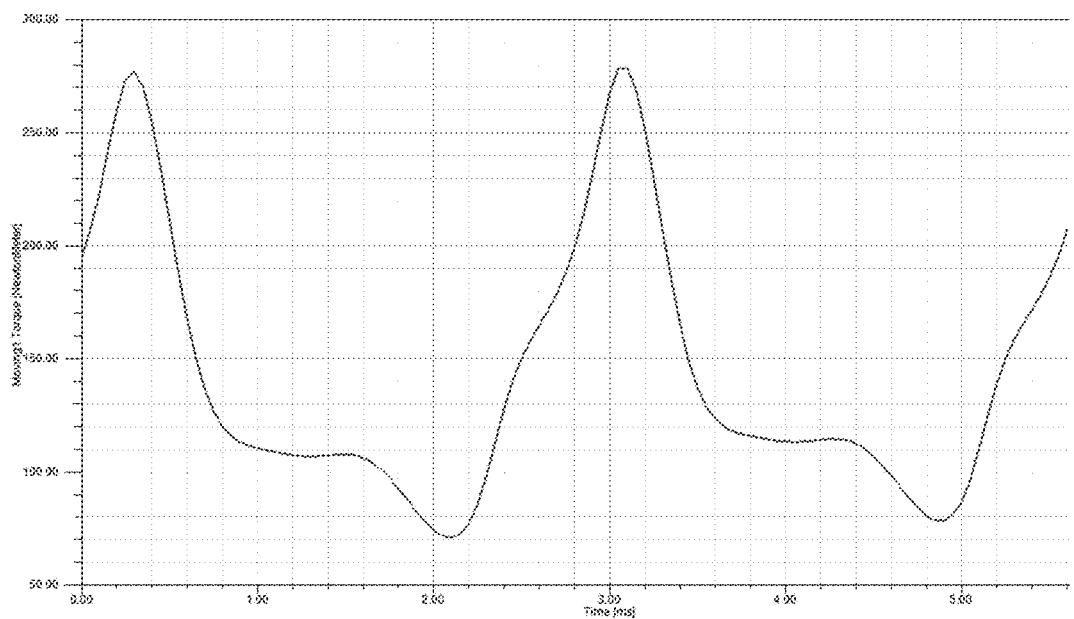
FIG. 9 is a graph showing a total torque value generated when a ratio of the number of outer magnets:the number of inner magnets:the number of conductors is 48:48:36 in the electric apparatus including the rotor and the stator according to some embodiments of the present disclosure.

FIG. 9 is a graph showing the total torque generated in case the number of outside magnets:the number of inside magnets:the number of conductors is 48:48:36 in the electric apparatus (R=448 mm) including the rotor and the stator according to some embodiments of the present disclosure.

As shown in FIG. 9, it can be seen that the positive torque value is significantly increased.

Figure 10:
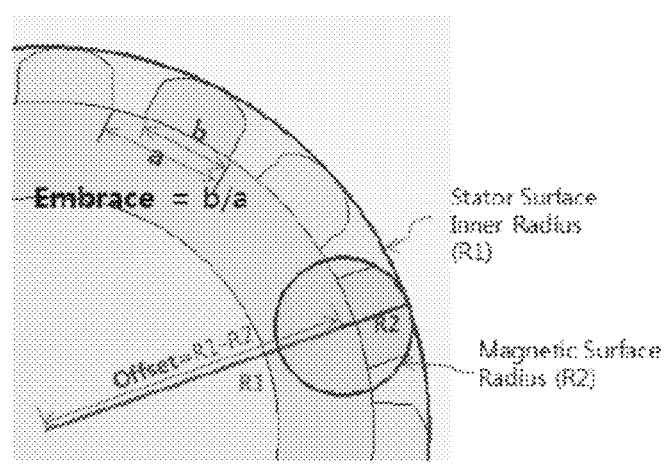
FIG. 10 is a schematic diagram for explaining an offset and an embrace of a magnet.
Figure 11:
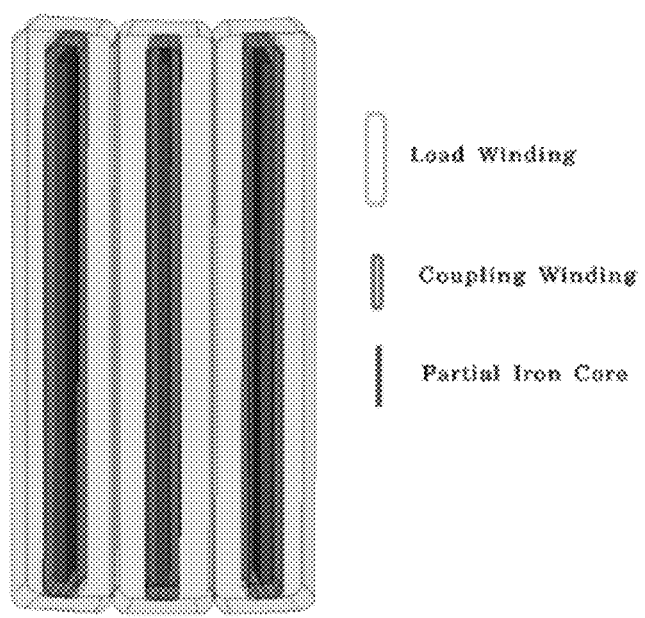
FIG. 11 is a schematic diagram of a coupling winding for controlling a change of magnetic flux.

Further, the shape of magnet can be changed to generate more of the average torque of the positive. In general, since lines of magnetic force of magnet are concentrated on the edge of the magnet and between the magnets, magnetic flux density is changed according to the positions of the magnets by deference between the lines of magnetic force of the surface of the magnet and the concentrated lines of magnetic force. Thus, according to some embodiments of the present disclosure, FIG. 10 shows an arrangement of magnets of a rotor considering the above conception, where the arrangement is constructed by utilizing a method for rounding the edges of the magnets via accurate analysis of magnetic flux density (referred to as an "offset") and a method for calculating an optimal distance between the magnets (referred to as an "embrace").

Further, the uniformly distributed lines of magnetic force, which come out of a polarity of a magnet and entered into a polarity of another magnet via a core, cause a conductor to make induced electromotive force. Thus, the arrangement of the core and the coil influence the total torque value of a rotor. In general, a conductor is arranged only by conventional coil and core. However, the conductor according to some embodiments of the present disclosure includes a coil which is unrelated to generation of electric power and controls the change of the lines of magnetic force, that is, the change of the lines of magnetic force by core and air gap, considering the effects related to distribution or concentration of the lines of magnetic force via simulation. Thus, it is possible to consistently accelerate the rotational torque of a rotor by maintaining an average torque value at a positive value via control of the change of the lines of magnetic force, regardless the generation of electric power. In this case, such a coil for controlling the change of the lines of magnetic force is defined to a coupling winding, and conventional conductor is defined to a load winding and a partial iron.

In some embodiments of the present disclosure, the first side of the core has projection parts 701, 702 protruding toward the rotational direction of a rotor on at least one of both ends of longitudinal direction of the core.

Further, in some embodiments of the present disclosure, the second side of the core has a shape of rounded corner convexed in the direction opposite to the rotational direction of the rotor on at least one of both ends of longitudinal direction of the core (see FIG. 7).

The projection parts 701, 702 protruding toward the rotational direction of the rotor on at least one of both ends of longitudinal direction of the first side of the core, decrease reluctance of the front portion of rotational direction by concentrating the density of the lines of magnetic force and generating a positive power (attractive force), and the shape of the rounded corner in the direction opposite to the rotational direction of the rotor on at least one of both ends of longitudinal direction of the second side of the core, increases reluctance of the back portion of rotational direction by distributing the density of lines of magnetic force and generating a negative power (repulsive force).

In some embodiments of the present disclosure, an electric apparatus is configured to satisfy that the ratio of the number of magnets n to the number of conductors m is n:m=4:3, have the number of magnets n and the number of conductors m assuming the value of 4 $L_i$:3 $L_i$ as the external diameter $R_i$ [mm] of the electric apparatus increases when the external diameter $R_i$ [mm] of the electric apparatus takes discrete values log $R_i$=2+0.5 (i−1) (i=1, 2, 3, . . . ), satisfy $L_i=8 \log R_i-12$ (i=1, 2, 3, ..., $L_i$ is a value rounded to the integer, and satisfy n:m=4 $L_i$:3 $L_i$ in the range of $0 \leq R_1$ and n:m=4 $L_{i+1}$:3 $L_{i+1}$ in the range of $R_i \leq R_{i+1}$.

For example, in case of the range $0 < R \leq 100$, L=4 and the optimal ratio of the number of magnets n to the number of conductors m is n:m=16:12, in case of the range $100 < R \leq 316$, L=8 and n:m=32:24, in case of the range $316 < R \leq 1000$, L=12 and n:m=48:36, and in case of the range $1000 < R \leq 3162$, L=16 and n:m=64:48.

According to the electric apparatus of some embodiments, the present disclosure improves shape, arrangement and layout of each element of an electric apparatus including a rotor, a stator, and a shaft, thus maximizing the torque. Hence, it is possible to improve the efficiency of the electric apparatus.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electric apparatus, comprising:
a plurality of magnets defining one of a rotor and a stator;
a conductor including a core and a coil, the conductor defining the other of the rotor and the stator; and
a shaft to which the stator is fixable,
wherein
the core has a width inwardly narrowed from an outer edge toward an inner edge along a longitudinal direction of the core,
the core includes a first side toward a first direction that is a direction of rotation of the rotor and a second side toward a second direction opposite to the first direction,
the first side is inwardly narrowed from the outer edge toward the inner edge along the longitudinal direction of the core at a first angle,
the second side is inwardly narrowed from the outer edge toward the inner edge along the longitudinal direction of the core at a second angle, and
the second angle is larger than the first angle.

2. The electric apparatus according to claim 1, wherein the first side has a projection portion protruding in the first direction on at least one of both edge portions of the core in the longitudinal direction.

3. The electric apparatus according to claim 2, wherein the second side has a rounded corner convexed in the second direction on at least one of both edge portions of the core in the longitudinal direction.

4. The electric apparatus according to claim 1, wherein the second side has a rounded corner convexed in the second direction on at least one of both edge portions of the core in the longitudinal direction.

5. The electric apparatus according to claim 1, wherein the rotor has a dual rotor structure comprising an inner rotor and an outer rotor.

6. An electric apparatus, comprising:
a plurality of magnets defining one of a rotor and a stator;
a conductor including a core and a coil, the conductor defining the other of the rotor and the stator; and
a shaft to which the stator is fixable,
wherein
an average value of a total torque applied to the rotor under a load condition is a positive value,
the core has a width inwardly narrowed from an outer edge toward an inner edge along a longitudinal direction of the core,
the core includes a first side toward a first direction that is a direction of rotation of the rotor and a second side toward a second direction opposite to the first direction,
the first side is inwardly narrowed from the outer edge toward the inner edge along the longitudinal direction of the core at a first angle,
the second side is inwardly narrowed from the outer edge toward the inner edge along the longitudinal direction of the core at a second angle, and
the second angle is larger than the first angle.

7. An electric apparatus, comprising:
a plurality of magnets defining one of a rotor and a stator;
a conductor including a core and a coil, the conductor defining the other of the rotor and the stator; and
a shaft to which the stator is fixable,
wherein
a ratio of the number of magnets n to the number of conductors m satisfies n:m=4 L:3 L, where a length of the conductors L is rounded to an integer, and
wherein
the core has a width inwardly narrowed from an outer edge toward an inner edge along a longitudinal direction of the core,
the core includes a first side toward a first direction that is a direction of rotation of the rotor and a second side toward a second direction opposite to the first direction,
the first side is inwardly narrowed from the outer edge toward the inner edge along the longitudinal direction of the core at a first angle,
the second side is inwardly narrowed from the outer edge toward the inner edge along the longitudinal direction of the core at a second angle, and
the second angle is larger than the first angle.

8. The electric apparatus according to claim 7, wherein the first side has a projection portion protruding in the first direction on at least one of both edge portions of the core in the longitudinal direction.

9. The electric apparatus according to claim 8, wherein the second side has a rounded corner convexed in the second direction on at least one of both edge portions of the core in the longitudinal direction.

10. The electric apparatus according to claim 7, wherein the second side has a rounded corner convexed in the second direction on at least one of both edge portions of the core in the longitudinal direction.

11. The electric apparatus according to claim 7, wherein the rotor has a dual rotor structure comprising an inner rotor and an outer rotor.

* * * * *